United States Patent
Chien et al.

(10) Patent No.: US 8,168,558 B2
(45) Date of Patent: May 1, 2012

(54) METHOD OF MANUFACTURING NANO-PLATINUM CATALYST ON NANO-SIZED SILICON DIOXIDE

(75) Inventors: Chun-Ching Chien, Taipei (TW); Ning-Yih Hsu, Keelung (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 188 days.

(21) Appl. No.: 12/782,797

(22) Filed: May 19, 2010

(65) Prior Publication Data
US 2011/0105298 A1    May 5, 2011

(30) Foreign Application Priority Data
Oct. 30, 2009   (TW) ............................... 98136790 A

(51) Int. Cl.
*B01J 21/00* (2006.01)
*B01J 37/34* (2006.01)

(52) U.S. Cl. ............ 502/262; 502/5; 502/258; 977/773; 977/775

(58) Field of Classification Search ............... 502/5, 258, 502/262; 977/700, 773, 775; 429/400
See application file for complete search history.

(56) References Cited

U.S. PATENT DOCUMENTS

| | | | | |
|---|---|---|---|---|
| 3,840,477 A | * | 10/1974 | Braithwaite et al. | 502/241 |
| 3,923,691 A | * | 12/1975 | Braithwaite et al. | 502/10 |
| 4,720,477 A | * | 1/1988 | Hettinger, Jr. | 502/255 |
| 6,221,308 B1 | * | 4/2001 | Peng | 264/630 |
| 7,771,619 B2 | * | 8/2010 | Riman et al. | 252/301.4 H |

\* cited by examiner

*Primary Examiner* — Cam N. Nguyen
(74) *Attorney, Agent, or Firm* — Jackson IPG PLLC; Demian K. Jackson

(57) ABSTRACT

The present disclosure uses a nano-$SiO_2$ powder as a supporter with $H_2PtCl_6$ added as an electro-catalyst precursor. A chemical reduction is processed at a high temperature to adhere nano-sized Pt ions on the nano-$SiO_2$ powder through reduction. Thus, a nano-Pt catalyst using nano-$SiO_2$ as supporter is manufactured for fuel cells, organic compound reactions and the textile industry.

7 Claims, 1 Drawing Sheet

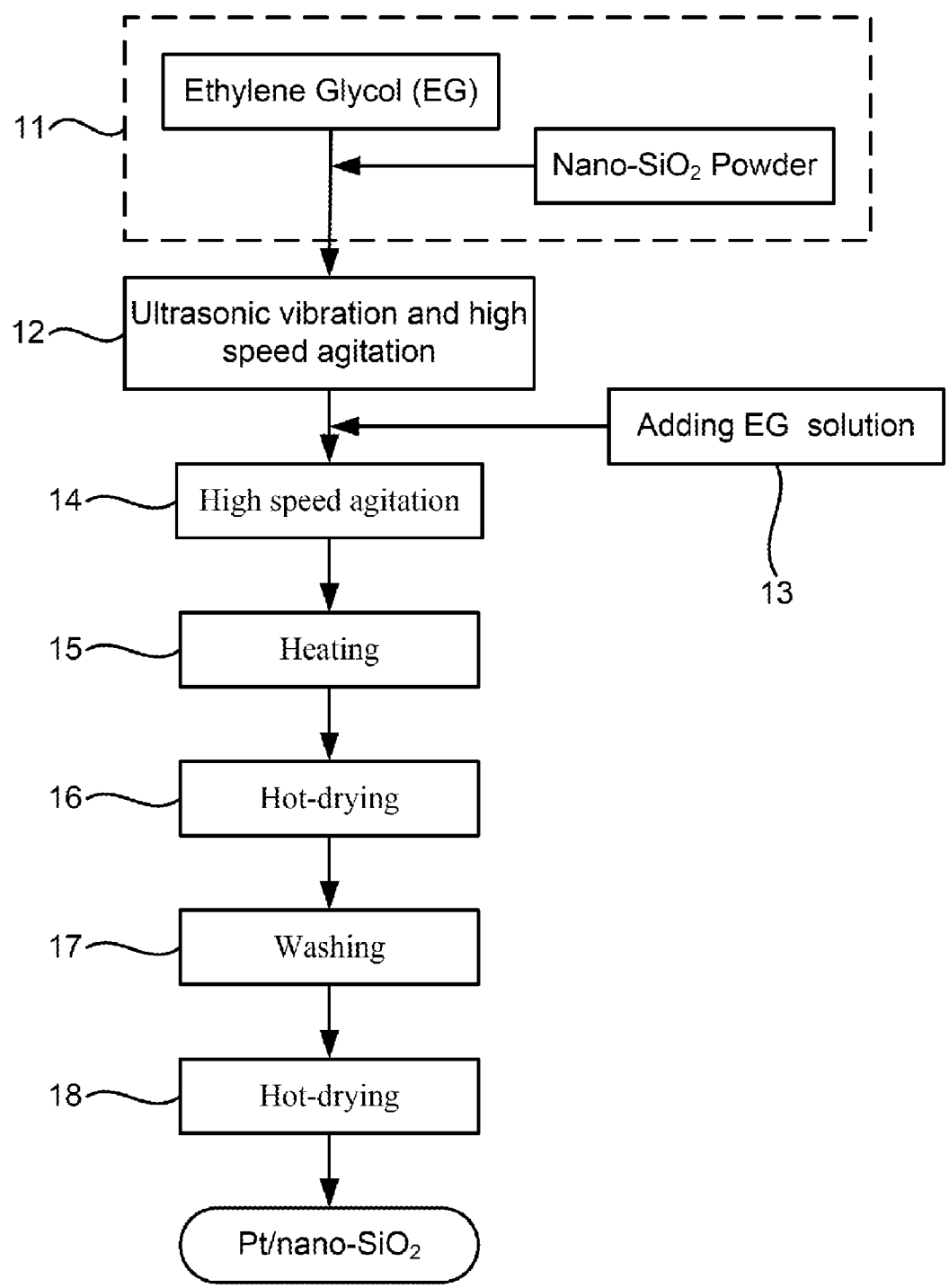

METHOD OF MANUFACTURING NANO-PLATINUM CATALYST ON NANO-SIZED SILICON DIOXIDE

CROSS REFERENCE TO RELATED PATENT APPLICATIONS

This application claims priority from Taiwan Patent Application No. 098136790, filed in the Taiwan Patent Office on Oct. 30, 2009, entitled "Method of Manufacturing Nano-Platinum Catalyst on Nano-Size Silicon Dioxide," and incorporates the Taiwan patent application in its entirety by reference.

TECHNICAL FIELD OF THE DISCLOSURE

The present disclosure relates to platinum (Pt) catalyst; more particularly, relates to adhering Pt complex ions on a powder of nano-sized silicon dioxide (nano-$SiO_2$) in a reaction using ethylene glycol (EG) at a high temperature for manufacturing a nano-Pt catalyst having a supporter of nano-$SiO_2$.

DESCRIPTION OF THE RELATED ART

A preferred electro-catalyst of direct methanol fuel cell (DMFC) is Pt catalyst particles. A method for manufacturing such Pt catalyst particles is sol-gel stabilization. The sol-gel stabilization is a kind of wet chemistry process where Pt catalyst particles are deposited on carbon electrodes. A solvent and a stabilizer, like EG, are used for reduction with a Pt precursor and a reductant to form a suspension of Pt colloidal particles. Because the stabilizer can not be easily removed, the formed Pt colloidal catalyst is usually directly used in catalytic reactions; or is covered on a supporter and then the stabilizer is removed at a temperature higher than 200° C. before being used in catalytic reactions. However, the existence of the stabilizer and the process of removing the stabilizer at a temperature higher than 200° C. are both not good to the performance of the Pt catalyst used as an electro-catalyst in DMFC. Hence, the prior art does not fulfill all users' requests on actual use.

SUMMARY OF THE DISCLOSURE

The main purpose of the present disclosure is to manufacture a nano-Pt catalyst having a supporter of nano-$SiO_2$.

The second purpose of the present disclosure is to manufacture a catalyst for fuel cells and organic compound reactions.

The third purpose of the present disclosure is to adhere Pt complex ions on a nano-$SiO_2$ powder in a reaction using EG at a high temperature.

To achieve the above purposes, the present disclosure is a method of manufacturing a nano-Pt catalyst on nano-sized $SiO_2$, comprising steps of: (a) adding a powder of nano-$SiO_2$ into a solution of EG; (b) processing ultrasonic vibration and high speed agitation to obtain a paste of nano-$SiO_2$; (c) adding a solution of EG having an electro-catalyst precursor into the paste of nano-$SiO_2$; (d) processing high speed agitation to obtain a mixed solution; (e) heating the mixed solution at a temperature of 160±10° C. to remove hydrogen and chlorine in the electro-catalyst precursor and to adhere metal catalyst particles in the electro-catalyst precursor to nano-$SiO_2$ and thus to obtain a powder of nano-$SiO_2$; (f) hot-drying the powder of nano-$SiO_2$ in vacuum with EG being removed; (g) washing the powder of nano-$SiO_2$ by using de-ionized water with remained EG being removed; and (h) hot-drying the powder of nano-$SiO_2$ in vacuum with de-ionized water being removed. Accordingly, a novel method of manufacturing a nano-Pt catalyst on nano-$SiO_2$ is obtained.

BRIEF DESCRIPTIONS OF THE DRAWINGS

The present disclosure will be better understood from the following detailed description of the preferred embodiment according to the present disclosure, taken in conjunction with the accompanying drawing, in which FIG. 1 is the flow view showing the preferred embodiment according to the present disclosure.

DESCRIPTION OF THE PREFERRED EMBODIMENT

The following description of the preferred embodiment is provided to understand the features and the structures of the present disclosure.

Please refer to FIG. 1, which is a flow view showing a preferred embodiment according to the present disclosure. As shown in the figure, the present invention is a method of manufacturing a nano-platinum (Pt) catalyst on nano-sized silicon dioxide ($SiO_2$), comprising the following steps:

(a) Pretreatment 11: A powder of $SiO_2$ is added into a solution of ethylene glycol (EG), where the powder of $SiO_2$ having a scale of nanometers or a larger scale.

(b) Ultrasonic vibration and high speed agitation 12: Ultrasonic vibration and high speed agitation are processed to form a paste of $SiO_2$;

(c) Precipitation 13: A solution of EG having an electro-catalyst precursor is added into the paste of $SiO_2$, where the electro-catalyst precursor is chloroplatinic acid ($H_2PtCl_6$).

(d) High speed agitation 14: High speed agitation is processed to obtain a mixed solution.

(e) Heating 15: The mixed solution is heated through microwaving at a temperature of 160±10° C. for 30 minutes to remove hydrogen and chlorine in $H_2PtCl_6$ and to adhere Pt catalyst particles in $H_2PtCl_6$ to $SiO_2$ and thus to obtain a powder of $SiO_2$. Or, the mixed solution can be heated through thermocouple.

(f) Hot-drying 16: The powder of $SiO_2$ is hot-dried in vacuum while EG is removed.

(g) Washing 17: The powder of $SiO_2$ is washed by using de-ionized water while remained EG is removed.

(h) Hot-drying 18: The powder of $SiO_2$ is hot-dried in vacuum while de-ionized water is removed.

Thus, a novel method of manufacturing a nano-Pt catalyst on nano-$SiO_2$ (Pt/nano-$SiO_2$) is obtained.

In the present disclosure, the nano-$SiO_2$ powder is used as a supporter; the Pt precursor, raw material; and, EG, reductant. Through chemical reduction, Pt complex ions are reduced to nano-sized clusters and are adhered on the nano-$SiO_2$ powder. Thus, adhesion and absorption of the Pt catalyst particles in $SiO_2$ is increased. Through doping $SiO_2$ (having a smaller adhesion than carbon nanotube) and EG, EG is easily removed through hot-drying in vacuum after the reduction at the high temperature. Since Pt catalyst has high activity, wide application and nano-$SiO_2$ can be easily processed to be applied in many fields, Pt/nano-$SiO_2$ is fit to be used as a catalyst in direct methanol fuel cell (DMFC) and proton exchange membrane fuel cell (PEMFC). Hence, Pt/nano-$SiO_2$ can be used in fuel cells and organic compound reactions, like gas phase dehydrogenation of simple molecules and hydrogen generation through molecular rearrangement.

To sum up, the present disclosure is a method of manufacturing a nano-Pt catalyst on nano-$SiO_2$, where the present disclosure uses a nano-$SiO_2$ powder as a supporter of a Pt catalyst; EG is used to be reacted at a high temperature for adhering Pt complex ions on nano-$SiO_2$ powders after reduction; adhesion and absorption of the Pt catalyst particles in $SiO_2$ are increased; through doping SiO2 (having a smaller adhesion than carbon nanotube) and EG, EG is easily removed through hot-drying in vacuum after reduction at a high temperature; and the present disclosure is thus fit to be applied to fuel cells and organic compound reactions.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A method of manufacturing a nano-platinum (Pt) catalyst on nano-sized silicon dioxide ($SiO_2$), comprising steps of:
    (a) adding a powder of $SiO_2$ into a solution of ethylene glycol (EG), wherein said powder of $SiO_2$ is a powder of $SiO_2$ having a scale of nanometers;
    (b) processing ultrasonic vibration and high speed agitation to obtain a paste of $SiO_2$;
    (c) adding a solution of EG having an electro-catalyst precursor into said paste of $SiO_2$;
    (d) processing high speed agitation to obtain a mixed solution;
    (e) heating said mixed solution at a temperature of $160\pm10°$ C. to remove hydrogen and chlorine in said electro-catalyst precursor and to adhere metal catalyst particles in said electro-catalyst precursor to $SiO_2$ and thus to obtain a powder of $SiO_2$;
    (f) hot-drying said powder of $SiO_2$ in vacuum with EG being removed;
    (g) washing said powder of $SiO_2$ by using de-ionized water with remained EG being removed; and
    (h) hot-drying said powder of $SiO_2$ in vacuum with de-ionized water being removed.

2. The method according to claim 1,
    wherein said powder of $SiO_2$ is a powder of $SiO_2$ having a scale larger than nanometers.

3. The method according to claim 1,
    wherein said electro-catalyst precursor is chloroplatinic acid ($H_2PtCl_6$).

4. The method according to claim 1,
    wherein, in step (e), said heating is processed through thermocouple.

5. The method according to claim 1,
    wherein, in step (e), said heating is processed through microwave for 30 minutes.

6. The method according to claim 1,
    wherein, in step (f) and step (h), said hot-drying is processed in vacuum at a temperature of $100\pm10°$ C.

7. The method according to claim 1,
    wherein said metal catalyst particles are Pt catalyst particles.

* * * * *